United States Patent Office 3,006,882
Patented Oct. 31, 1961

3,006,882
PROCESS FOR DYEING FIBER-FORMING POLYAMIDES FROM THE MELT
Hans Altermatt and Jakob Koch, Basel, Switzerland, assignors to Ciba Limited, Basel, Switzerland
No Drawing. Filed Sept. 18, 1959, Ser. No. 840,822
Claims priority, application Switzerland Oct. 6, 1958
6 Claims. (Cl. 260—37)

The dyeing of high melting organic substances in the mass, for example, superpolyamides or polyethylene terephthalates, places such high demands upon dyestuffs with regard to thermostability that inorganic pigments have mainly been used for this purpose hitherto. However, inorganic pigments produce colorations of poor color strength and fibers colored therewith have rather dull tints. Attempts have therefore been made to use organic pigments instead of inorganic pigments. Hitherto very few organic dyestuffs are known that do not decompose at the melting points of the aforesaid organic substances, for example, copper phthalocyanine.

The present invention is based on the industrially important observation that perylene tetracarboxylic acid diimides are very suitable for dyeing high melting substances capable of being spun such, for example, as superpolyamides, polyethylene or polyethylene terephthalates.

The perylene tetracarboxylic acid diimides used in the process of this invention advantageously correspond to the formula (1) 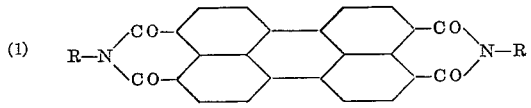

in which R represents a hydrogen atom or an alkyl radical which may be substituted, for example, a methyl or ethyl radical, or an aryl radical which may be substituted, for example, a phenyl, para- or meta-methyl phenyl, 2:4- or 3:5-dimethylphenyl or para-alkoxy phenyl radical. The perylene radical may be substituted, for example, by a halogen atom, especially a chlorine atom, or an alkoxy group, more especially a methoxy group. All these compounds can be made by methods in themselves known.

In order to incorporate the dyestuffs of the above formula with the material to be dyed, it is of advantage to "bread-crumb" the material in the form of powder, granules or chippings with the dry dyestuff powder, that is to say, the material is mixed with the dyestuff mechanically in such manner that the surfaces of the particles of the material are coated with a layer of the dyestuff powder. The dyestuff is advantageously used in a very finely divided form. Especially good results are obtained by using a dyestuff preparation consisting of a fine powder of a material to be dyed which contains the dyestuff for example, in the manner described in Belgian specification No. 567,953 by dispersing the dyestuff in a solution of a polyamide in formic acid and precipitating the pigmented polyamide by the addition of water.

The "bread-crumbed" particles of the material to be dyed are then melted and spun or otherwise shaped, for example, to foils, by a method in itself known. The plastic to be dyed can also be dyed by adding the dyestuff before, during or at the end of the polycondensation of the monomer. The dyed material so obtained is then shaped by itself or in admixture with another dyed or undyed material in the same manner as the undyed material would be shaped.

The dyeings produced by the process of the invention are distinguished by their high purity and excellent fastness to light.

The following examples illustrate the invention, the parts and percentages being by weight:

Example 1

99 parts of the polyamide of hexamethylene diamine and adipic acid in the form of chippings are "breadcrumbed" in the dry state with 1 part of the dyestuff of the Formula 1 in which the two symbols R represent hydrogen atoms, the dyestuff being in a very finely divided state. The bread-crumbed chippings are spun in the usual manner, for example, by the grid spinning process, at about 290–295° C. The filaments so obtained are dyed a violet-red tint, and the dyeing has an excellent fastness to light and excellent properties of wet fastness.

Several further dyestuffs are given in the following table, which dye nylon in the above manner the tints given in the second column.

| Dyestuff of Formula 1, in which R = | Color of polyamide fibers dyed with the dyestuff |
|---|---|
| —CH₃ | ruby red. |
| —C₂H₅ | red. |
|  | red. |
|  | red. |
|  | red-orange. |
|  —OCH₃ | bluish red. |
| —⟨⟩—OCH₂CH₃ | bluish red. |

What is claimed is:
1. A process for dyeing fiber-forming polyamides which comprises incorporating into the molten polyamide a finely divided 3, 4, 9, 10 perylene tetracarboxylic acid diimide.
2. A process as claimed in claim 1, wherein the perylene tetracarboxylic acid is of the formula.

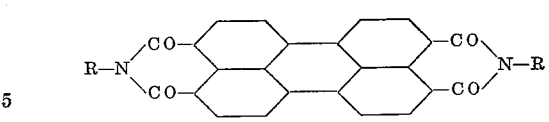

in which R represents a member selected from the group consisting of hydrogen atoms, alkyl and aryl radicals.
3. A process as claimed in claim 1, wherein the perylene tetracarboxylic acid diimide is of the formula

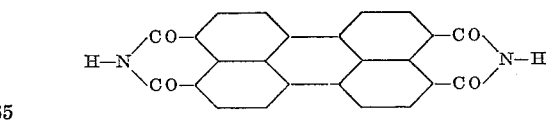

4. A process as claimed in claim 1, wherein the perylene tetracarboxylic acid diimide is of the formula

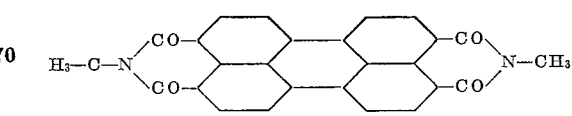

5. A process as claimed in claim 1, wherein the perylene tetracarboxylic acid diimide is of the formula
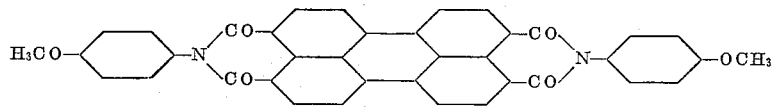
6. Polyamides which have been dyed by the process claimed in claim 1.
References Cited in the file of this patent
UNITED STATES PATENTS
2,890,220    Eckert et al. _____ June 9, 1959